United States Patent
Haddadin et al.

(10) Patent No.: US 12,418,868 B2
(45) Date of Patent: Sep. 16, 2025

(54) RECOMMENDATION TRAINING AGENT FOR MACHINE LEARNING ALGORITHM AND RELATED METHODS

(71) Applicant: L3HARRIS TECHNOLOGIES, INC., Melbourne, FL (US)

(72) Inventors: Osama S. Haddadin, Salt Lake City, UT (US); Armin Hedzic, Mesa, AZ (US); Andrew L. Nelson, Salt Lake City, UT (US); Boston C. Terry, Mesa, AZ (US); Seth J. Thorup, Sandy, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 432 days.

(21) Appl. No.: 17/703,319

(22) Filed: Mar. 24, 2022

(65) Prior Publication Data

US 2023/0309031 A1    Sep. 28, 2023

(51) Int. Cl.
*H04W 56/00* (2009.01)
*G06F 18/214* (2023.01)
*G06N 3/006* (2023.01)
*G06N 20/00* (2019.01)
*H04W 24/02* (2009.01)

(52) U.S. Cl.
CPC .......... *H04W 56/00* (2013.01); *G06F 18/214* (2023.01); *G06N 20/00* (2019.01); *H04W 24/02* (2013.01)

(58) Field of Classification Search
CPC ...... H04W 56/00; H04W 24/02; G06N 20/00; G06F 18/214

USPC .......................................................... 370/350
See application file for complete search history.

(56) References Cited

U.S. PATENT DOCUMENTS

| | | | |
|---|---|---|---|
| 10,039,016 B1 * | 7/2018 | Larish | H04W 24/02 |
| 10,275,473 B2 | 4/2019 | Kim et al. | |
| 11,265,391 B1 * | 3/2022 | Baruch | G06Q 40/08 |
| 2017/0132513 A1 | 5/2017 | Yu et al. | |
| 2019/0303759 A1 * | 10/2019 | Farabet | G05D 1/00 |
| 2020/0412417 A1 * | 12/2020 | Calzolari | G06N 3/084 |
| 2021/0089915 A1 | 3/2021 | Xu et al. | |
| 2021/0273852 A1 * | 9/2021 | Horne | H04W 24/02 |
| 2022/0368571 A1 * | 11/2022 | Yu | H04B 1/62 |
| 2023/0268942 A1 * | 8/2023 | Ghannouchi | H04B 10/00 375/297 |

FOREIGN PATENT DOCUMENTS

| | | |
|---|---|---|
| CN | 109858574 | 6/2019 |
| JP | 2019530105 | 10/2019 |

* cited by examiner

*Primary Examiner* — Xuan Lu
(74) *Attorney, Agent, or Firm* — ALLEN, DYER, DOPPELT, + GILCHRIST, P.A.

(57) ABSTRACT

A radio frequency (RF) system may include at least one RF sensor in an RF environment and at least one RF actuator. The RF system may also include at least one processor that includes a machine learning agent configured to use a machine learning algorithm to generate an RF model to operate the at least one RF actuator based upon the at least one RF sensor. The processor may also include a recommendation training agent configured to generate performance data from the machine learning agent, and change the RF environment based upon the performance data so that the machine learning agent updates the machine learning algorithm.

20 Claims, 5 Drawing Sheets

RECOMMENDATION TRAINING AGENT FOR MACHINE LEARNING ALGORITHM AND RELATED METHODS

TECHNICAL FIELD

The present invention relates to the field of radio frequency (RF) systems, and more particularly, to machine learning in RF systems and related methods.

BACKGROUND

A typical radio frequency (RF) system may include one or more RF receivers and/or transmitters. Various parameters of the RF system may be adjusted or set to achieve desired operation, for example, with respect to operating frequency, bandwidth, etc.

Machine learning involves the study of algorithms that can improve themselves through experience and by the use of data. A machine learning algorithm builds a model based on sample data, for example, known as training data, to make predictions or decisions without being explicitly programmed to do so. A machine learning algorithm may be used in a wide variety of applications, such as in medicine, email filtering, speech recognition, and computer vision, for example, where it may be difficult or unfeasible to develop conventional algorithms to perform the desired operations.

A typical RF based artificial intelligence or machine learning (AI/ML) system includes using sensed data to learn or train algorithms. Performance of the system is evaluated, and based upon the sensed data and algorithms, actuators may be operated, for example, to adjust the various parameters.

SUMMARY

A radio frequency (RF) system may include at least one RF sensor in an RF environment, at least one RF actuator, and at least one processor. The at least one processor may include a machine learning agent configured to use a machine learning algorithm to generate an RF model to operate the at least one RF actuator based upon the at least one RF sensor. The at least one processor may also include a recommendation training agent configured to generate performance data from the machine learning agent, and change the RF environment based upon the performance data so that the machine learning agent updates the machine learning algorithm.

The RF environment may include one of laboratory RF environment, a field RF environment, and a virtual RF environment. The RF environment may include at least one RF source, and changing the RF environment may include adding another RF source to the RF environment, for example.

The recommendation training agent may be configured to test the machine learning algorithm with at least one perturbation after updating the machine learning algorithm. The recommendation training agent may be configured to generate at least one knowledge graph based upon the RF model and the performance data, and change the RF environment based upon the at least one knowledge graph, for example. The recommendation training agent may be configured to generate the at least one knowledge graph based upon at least one of terrain data, RF clutter data, and RF interference data, for example.

The recommendation training agent may be configured to obtain the at least one of the terrain data, RF clutter data, and RF interference data from the at least one sensor, for example. The at least one knowledge graph may include a plurality of knowledge graphs. The recommendation training agent may be configured to update the machine learning algorithm based upon a global neural network (GNN) of the plurality of knowledge graphs, for example.

The recommendation training agent may be configured to update the at least one knowledge graph based upon the at least one perturbation. The at least one sensor may include an RF receiver. The at least one actuator may include an RF operating frequency selector, for example.

A method aspect is directed to a method of training a machine learning algorithm. The method may include operating a machine learning agent of a processor to generate, using the machine learning algorithm, a radio frequency (RF) model to operate at least one RF actuator based upon at least one RF sensor in an RF environment. The method may also include operating a recommendation training agent of the processor to generate performance data from the machine learning agent, and change the RF environment based upon the performance data so that the machine learning agent updates the machine learning algorithm.

A computer readable medium aspect is directed to a non-transitory computer readable medium for training a machine learning algorithm. The non-transitory computer readable medium includes computer executable instructions that when executed by a processor cause the processor to perform operations. The operations may include operating a machine learning agent to generate, using the machine learning algorithm, a radio frequency (RF) model to operate at least one RF actuator based upon at least one RF sensor in an RF environment. The operations may also include operating a recommendation training agent to generate performance data from the machine learning agent, and change the RF environment based upon the performance data so that the machine learning agent updates the machine learning algorithm.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
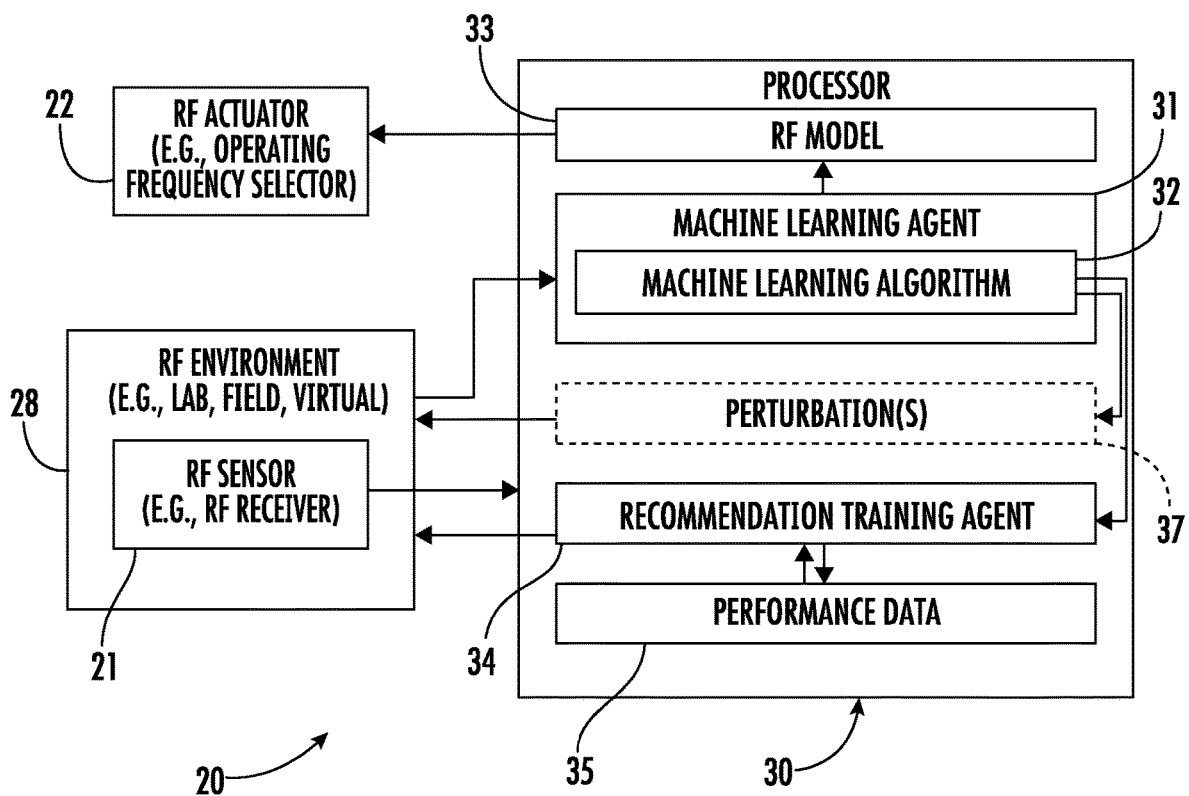
FIG. 1 is a schematic block diagram of an RF system in accordance with an embodiment.
Figure 2:
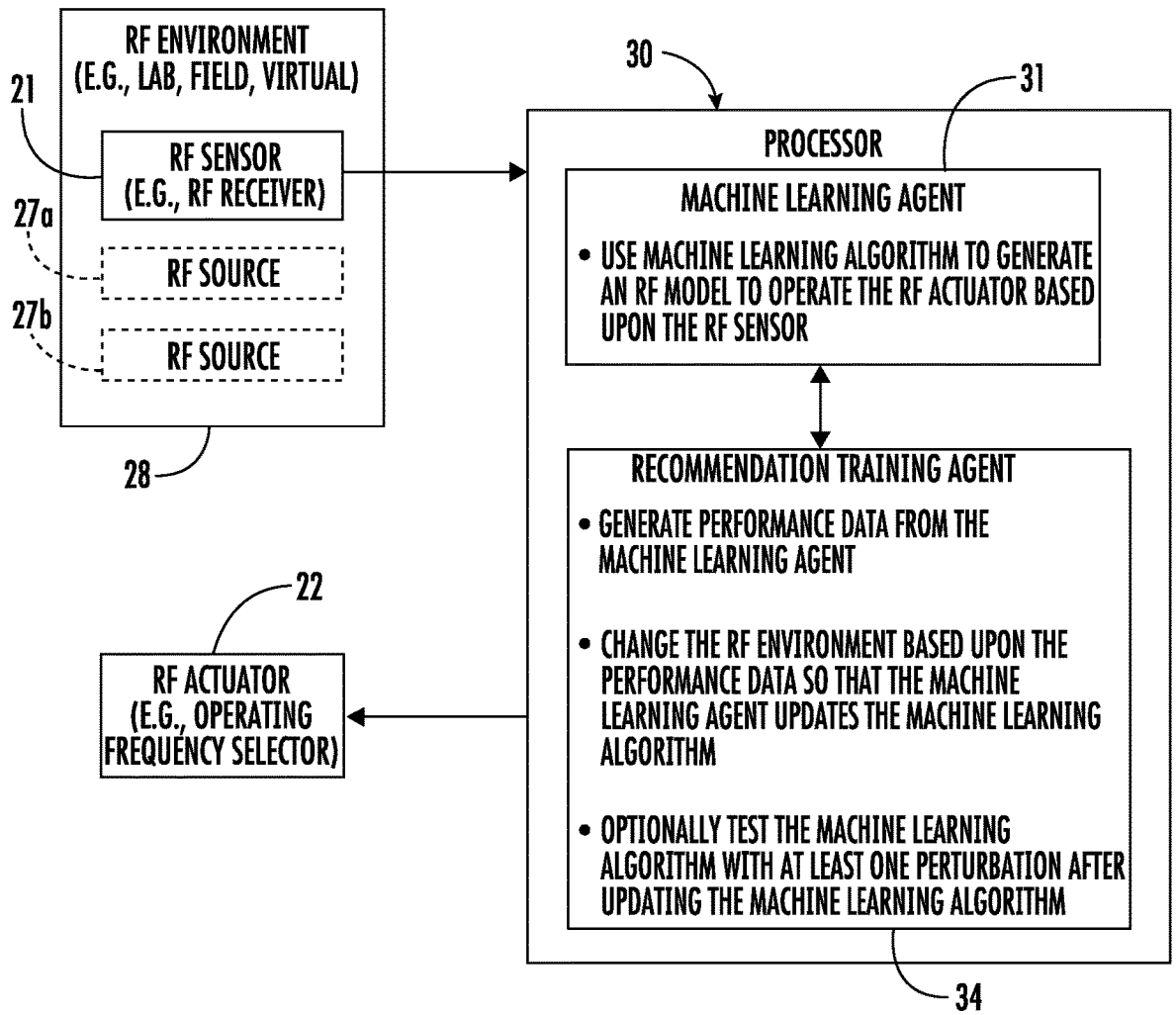
FIG. 2 is another schematic block diagram of the RF system of FIG. 1.

Referring initially to FIGS. 1 and 2 a radio frequency (RF) system 20 includes an RF sensor 21 in an RF environment 28. The RF sensor 21 may be an RF receiver, for example, which may be coupled to one or more antennas. The RF receiver 21 may operate at a desired operating frequency. There may be more than one RF receiver 21 each operating at a different operating frequency or frequency range. The RF sensor 21 may alternatively or additionally include an RF signal analyzer to detect or sense changes in received RF signals. The RF sensor 21 may include other and/or additional sensors, as will be appreciated by those skilled in the art, and there may be more than one RF sensor 21.

The RF environment 28 may include any of a laboratory RF environment, a field RF environment, and a virtual RF environment. The RF environment 28 may include an RF source 27a, for example. The RF environment may include other and/or additional RF devices, as will be appreciated by those skilled in the art.

The RF sensor 21 may sense terrain data, RF clutter data, and/or RF interference data, including intentional and unintentional RF interference data. The RF sensor 21 may sense other and/or additional types of data.

The RF system 20 also includes an RF actuator 22. The RF actuator 22 may include an operating frequency selector, for example, that when operated or actuated, operates an RF transmitter or RF receiver to operate at a desired frequency or frequency range. The RF actuator 22 may include other and/or additional actuators, as will be appreciated by those skilled in the art, and there may be more than one RF actuator 22.

Figure 3:
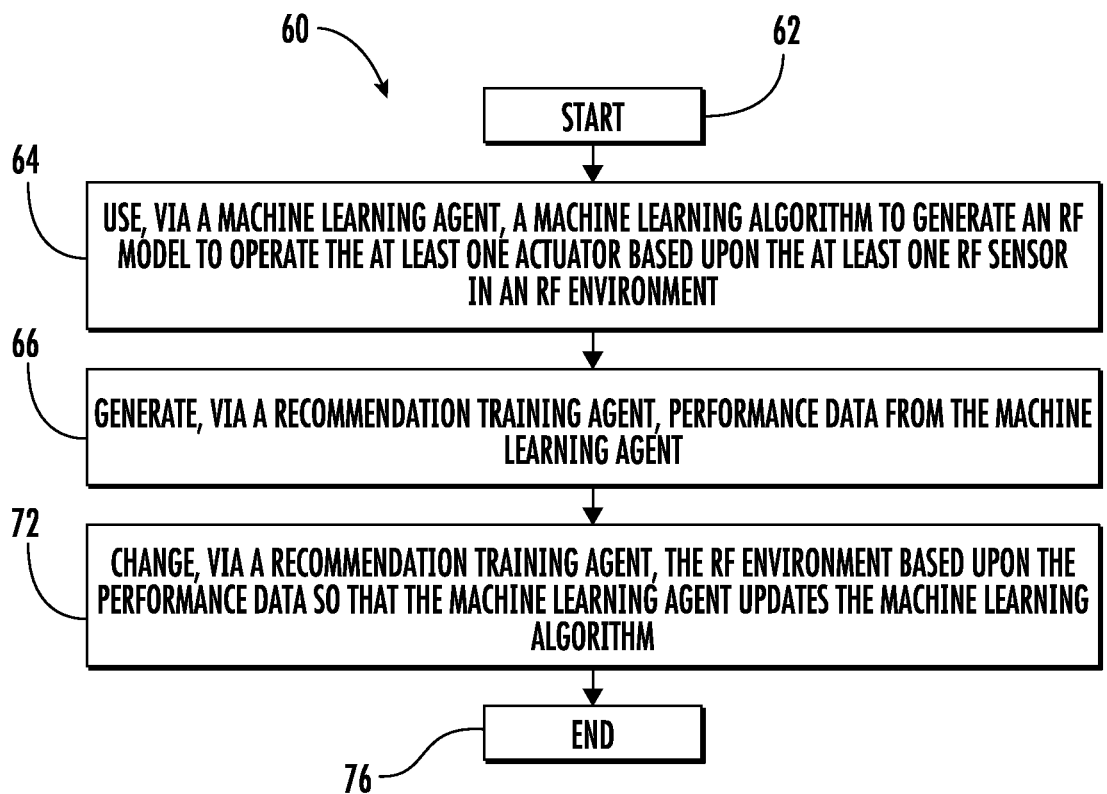
FIG. 3 is a flow chart of operation of the RF system of FIG. 1.

The RF system 20 also includes a processor 30. Referring now to the flowchart 60 in FIG. 3, beginning at Block 62, operations of the processor 30 will now be described. Those skilled in the art will appreciate that a memory may be coupled to the processor 30, and the memory may cooperate with the processor to perform the operations described herein. The processor 30 includes a machine learning agent 31. As will be appreciated by those skilled in the art, as an agent, the machine learning agent 31 functions as an agent for a user or another program, working autonomously and continuously in a particular environment. The machine learning agent 31 may advantageously learn from its experience in functioning in an environment over a relatively long period of time. The machine learning agent 31 may conceptually be considered a "system under test."

At Block 64, the machine learning agent 31 is configured to use a machine learning algorithm 32 to generate an RF model 33 to operate the RF actuator 22 based upon the RF sensor 21. More particularly, the machine learning algorithm 32 learns effects of the environment and operates based upon the learned effects. For example, the machine learning agent 31 may change the RF or radio configuration of the system, such as changing the frequency, based upon changes in the RF environment 28.

The processor 30 also includes a recommendation training agent 34. The recommendation agent 34 generates performance data 35 from the machine learning agent 31 (Block 66). In other words, the recommendation agent 34 monitors performance of the machine learning algorithm 32 from the machine learning agent 31 with respect to, for example, how accurate the machine learning algorithm is performing in the given environment.

The recommendation training agent 34, as a machine learning/artificial intelligence agent, changes the RF environment 28 based upon the performance data 35 so that the machine learning agent 31 updates the machine learning algorithm 32 (Block 72). For example, the recommendation training agent 34 may add another RF source 27b to the RF environment 28. The recommendation training agent 34 may optionally test the machine learning algorithm 32 with one or more perturbations 37 after updating the training of the machine learning algorithm.

More particularly, the recommendation training agent 34 recommends more or additional training using, for example, specific data sets. The recommendation training agent 34 also may request data generation with specific environment model generation, as well as recommend performance metrics as a measure of performance for any given domain. These recommendations are tested, for example, with the perturbations 37, for example, injected into the RF environment 28, for evaluation of the robustness of the recommendation training agent 34. Operations end at Block 76.

Figure 4:
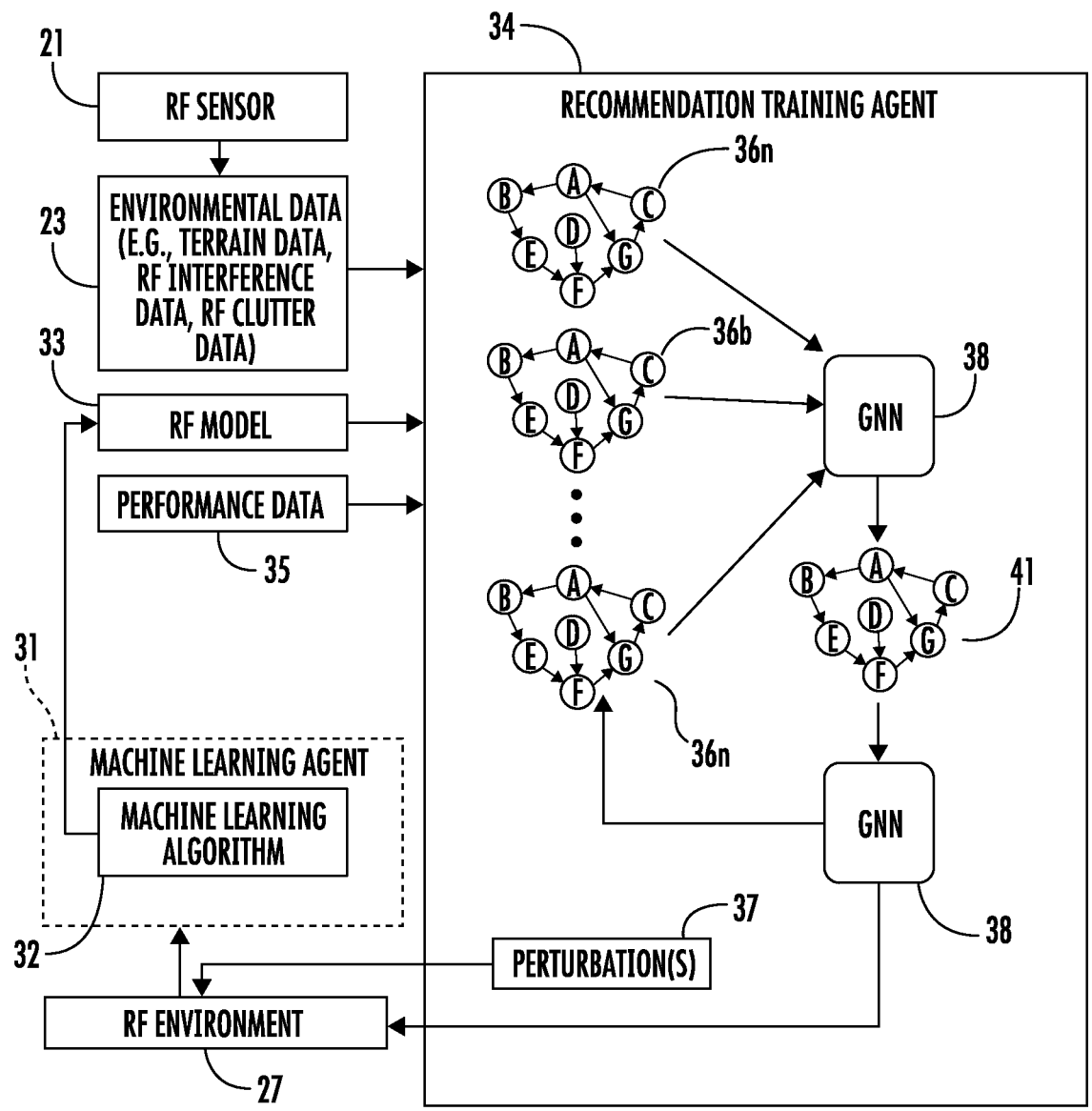
FIG. 4 is a more detailed schematic block diagram of the RF system of FIG. 1.
Figure 5:
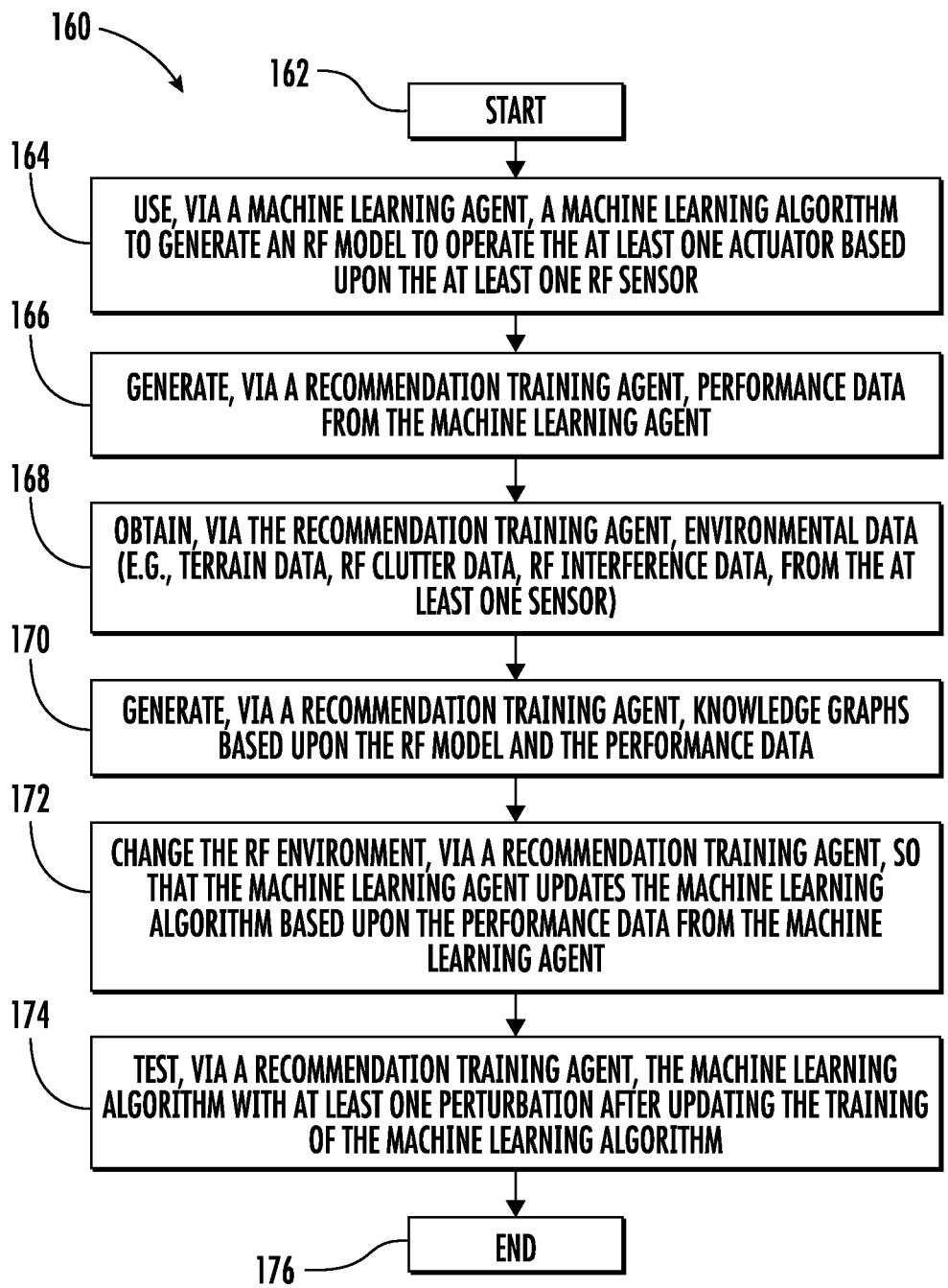
FIG. 5 is a more detailed flow diagram illustrating more detailed operations of the RF system of FIG. 1.

Referring now to FIG. 4 and the flow chart 160 in FIG. 5, beginning at Block 162, more detailed operations of the processor 30 will now be described. More particularly, at Block 168, the recommendation training agent 34 obtains environmental data 23 (e.g., terrain data, RF interference data, RF clutter data) sensed, for example, from the RF sensor 21. In some embodiments, the environmental data 23 may be obtained from a data source, such as, for example, a remote server, rather than the RF sensor 21. At Block 170, the recommendation training agent 34 generates knowledge graphs 36a-36n based upon the RF model 33, the performance data 35, and one or more of the environment data components (i.e., terrain data, RF clutter data, and RF interference data).

The recommendation training agent 34, accepts, for example, a knowledge base that includes data sets, such as the environmental data described above. The recommendation training agent 34 also accepts performance metrics, and data representative relationships. The accepted inputs may define the observed behavior and performance.

The recommendation training agent 34 changes the RF environment 28 based upon the performance data 35 from the machine learning agent 31 and the knowledge graphs so that the machine learning agent 31 updates the machine learning algorithm 32 (Block 172). More particularly, the knowledge graphs 36a-36n are included as part of a graph neural network (GNN) 38 serving as a basis for updating the machine learning algorithm 32. In some embodiments, a graph convolutional network (GCN) of the knowledge graphs 36a-36n may serve as the basis for updating the machine learning algorithm 32. More particularly, the recommendation training agent 34 searches the performance space or analyzes the performance data with the use of the knowledge graphs 36a-36n to trace associations between training data, model parameters, and performance. The knowledge graphs 36a-36n may be combined and reconciled such that new and existing training data 41 is input to the GNN 38, for example. The recommendation training agent 34 may update the knowledge graphs 36a-36n based upon discovered insights, for example, updated with agent performance. Patterns discovered or "insight" may be reported as recommendations for the machine learning agent 31.

The recommendation training agent 34 changes the RF environment 28 based upon the performance data 35 from the machine learning agent 31 so that the machine learning agent updates training of the machine learning algorithm 32, and tests the machine learning algorithm with the perturbation 37 after updating the training of the machine learning algorithm at Block 172 and 174, respectively. Operations end at Block 176.

The RF system 20 may advantageously satisfy system design parameters with respect to how to train and validate performance, how to manage, correlate, and update the training data, and how to acquire or improve existing policy, and find weaknesses in the existing policy, for example. As will be appreciated by those skilled in the art, one of the challenges with an agent-based system is training. It may be desirable to have labeled data representative of the environment, sensors, and actuators, and access to metrics and techniques to measure performance or cost of decisions made. Moreover, training data may become relatively large and difficult to manage (store, retrieve, label, disambiguate, clean). Another challenge may be determining coverage—does available data cover problem space. In other words, is available data well representative of the problem space or obtained with a narrow focus.

Another challenge with agent-based systems is verification and validation in a multi-domain application. More particularly, in determining performance, performance metrics, an increased amount of data, and techniques of assessing the performance are generally desirable. However, it remains a challenge to determine how to collect and test artificial intelligence (AI) agents during field trials, and to collect data for use in offline training.

Indeed, the present RF system 20 may provide automated observations of performance (during training and test), and use the recommendation training agent 34 to control or adapt new configurations of the training process (models, trials, data sets). The RF system 20 may advantageously be trained in a laboratory for implementation in the field, may be trained in and used in the field, and/or combination of laboratory and field. Moreover, by using knowledge graphs, configuration parameters, training data, performance, and relationships among all entities (generated from models, field trials, or other systems) may be captured. The RF system 20 may also advantageously address testing, verification, and validations shortcomings due to a lack of proper code coverage, for example, which may be inherent in complex systems that include one or more AI/ML agents.

In a given implementation example, the RF system 20, and more particularly, the machine learning agent 31, may adjust power rate and frequency in a mesh network to optimize connectivity, for example. The recommendation training agent 34 may adjust the flight path of the platform the RF source is "riding on", how many platforms and radios are under test, what type of data is being generated and pushed through the network, for example, to locate areas of terrain.

In another more detailed exemplary use case, the machine learning agent 31 may be conceptually considered a player in a game. Two aircraft may be flying in simple patterns transmitting using fixed omnidirectional antennas. The machine learning agent 31, which may be considered an intelligent agent (IA) is being trained to operate in a low probability of detection (LPD) mode. The IA will attempt to maintain a RF link using the least amount of power to reduce the likelihood of being detectable from a distance. The IA is controlling the power, rate and frequency for the link. There is a terrain blockage and undesirable RF source in the scenario. The IA is learning to optimize the RF link while reducing or minimizing power. The IA accounts for outages due to terrain, which cannot be resolved by adjusting power, rate, or frequency, versus interruptions due to an undesirable RF source, which can be resolved using power rate and frequency. The RF link requirements will vary based on a user data rate requirement, for example. So as the user pushes more data through the system more power is used to maintain the link without dropping data, and vise-versa.

The IA can also adjust frequency when sensing additional RF sources, however this may break the RF link and may require reacquisition, as will be appreciated by those skilled in the art. The amount of user data received by the nodes verses spectral flux density (SFD) measured at detection points on the ground may be regarded as the performance metric. Optimizing higher user data reception with a lower SFD is generally desirable.

With respect to sensing and perception, the IA may be aware of the power rate and frequency of transmission. The IA is aware of, or has as in input thereto, the received signal-to-noise ratio (SNR) at the receiving node as long as there is a return RF link from receiver to sender. The IA accepts as input, the antenna pattern and radio characteristics and has a digital terrain elevation data (DTED) library associated therewith, which can estimate the terrain heights over which it is flying. This allows the IA to more accurately predict outages due to terrain blockage as well as know the distance between the antenna and the ground.

Control of the recommendation training agent 34 may conceptually be considered a level in a game. The recommendation training agent 34 may change the RF environment, for example, via RF actuators 22. The environment to be changed may include a number of platforms and radios, data traffic pushed through the network, detector location, RF source power and detection, aircraft speed, aircraft altitude, aircraft flight path. The above considers, for this exemplary implementation example, that one of the areas desirable for testing is a terrain-based outage, in which case, the recommendation training agent 34 may suggest training in areas where terrain blockage will occur as well as areas where it does not.

With respect to differences in types of data, the differences in types of data may conceptually be considered game results (e.g., player score vs level difficulty and diversity). Training data sets may include two sets of data, for example. One data set is associated with the IA, and the other may be associated with the recommendation training agent 34 or training agent (TA). The data for the IA may be generated by a data link simulator (CNES) and a spectrum simulator (ARCS). Simulation data may be is embedded into a high dimensional latent representation with pre-trained models (e.g., an ARCS classifier for spectrum data) for each data domain. This latent data may be used as nodes arranged in an ontology specific to the application to create a knowledge graph used by the IA. The knowledge graph representation is typically updated at each time step based on evolution of the simulation and actions of the IA (e.g., if the IA changes frequency, the spectrum data node will reflect that in the graph). The knowledge graph, agent actions, and rewards are saved after each run, and act as the training data for the TA.

The recommendation training agent 34 (TA) itself may conceptually be considered the level creator in the game. A reinforcement learning agent typically undergoes a training loop. This loop goes through the following steps: data set/scenario setup; training; and performance analysis. Typically, the data set/scenario setup and performance analysis are done manually by engineers. This may prevent the entire training loop from being fully automated until the agent performance is satisfactory. Accordingly, one purpose of the TA is to automate these steps using artificial intelligence (AI). Due to the TA having the function of training the IA, the TA is placed in an outer training loop that wraps the IA training loop. The TA starts the IA training. After every scenario, the TA takes the knowledge graph data, agent actions, and rewards to determine how to adjust the knowledge graph representations to better train the IA in a next scenario. The TA is simultaneously being trained itself, by utilizing the performance of the IA as its reward function.

A method aspect is directed to a method of training a machine learning algorithm. The method includes operating a machine learning agent 31 of a processor 30 to generate, using the machine learning algorithm 32, an RF model to operate at least one RF actuator 22 based upon at least one RF sensor 21. The method also includes operating a recommendation training agent 34 of the processor 30 to generate performance data 35 from the machine learning agent 31, instruct the machine learning agent to update training of the machine learning algorithm 32 based upon the performance data from the machine learning agent, and test the machine learning algorithm with at least one perturbation 37 after updating the training of the machine learning algorithm.

A computer readable medium aspect is directed to a non-transitory computer readable medium for training a machine learning algorithm. The non-transitory computer readable medium includes computer executable instructions that when executed by a processor 30 cause the processor to perform operations. The operations include operating a machine learning agent 31 to generate, using the machine learning algorithm 32, an RF model to operate at least one RF actuator 22 based upon at least one RF sensor 21. The operations also include operating a recommendation training agent 34 to generate performance data 35 from the machine learning agent 31, instruct the machine learning agent to update training of the machine learning algorithm 32 based upon the performance data from the machine learning agent, and test the machine learning algorithm with at least one perturbation 37 after updating the training of the machine learning algorithm.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) system comprising:
    at least one RF sensor within an RF environment;
    at least one RF actuator comprising an RF operating frequency selector; and
    at least one processor comprising
        a machine learning agent configured to use a machine learning algorithm to generate an RF model to operate the at least one RF actuator based upon the at least one RF sensor, and
        a recommendation training agent configured to
            generate performance data from the machine learning agent based upon operation of the machine learning algorithm within the RF environment,
            obtain environmental data from the at least one RF sensor, the environmental data comprising terrain data, RF interference data, and RF clutter data, and
            change the RF environment based upon the performance data and based upon the environmental data so that the machine learning agent updates the machine learning algorithm.

2. The RF system of claim 1 wherein the RF environment comprises one of a laboratory RF environment, a field RF environment, and a virtual RF environment.

3. The RF system of claim 1 wherein the RF environment comprises at least one RF source; and wherein changing the RF environment comprises adding another RF source to the RF environment.

4. The RF system of claim 1 wherein the recommendation training agent is configured to test the machine learning algorithm with at least one perturbation after updating the machine learning algorithm.

5. The RF system of claim 1 wherein the recommendation training agent is configured to generate at least one knowledge graph based upon the RF model, the environmental data, and the performance data, and change the RF environment based upon the at least one knowledge graph.

6. The RF system of claim 5 wherein the at least one knowledge graph comprises a plurality of knowledge graphs; and wherein the machine learning agent is configured to update the machine learning algorithm based upon a global neural network (GNN) of the plurality of knowledge graphs.

7. The RF system of claim 1 wherein the at least one sensor comprises an RF receiver.

8. A controller for a radio frequency (RF) system comprising at least one RF sensor within an RF environment and at least one RF actuator comprising an RF operating frequency selector, the controller comprising:
    a machine learning agent configured to use a machine learning algorithm to generate an RF model to operate at least one RF actuator based upon at least one RF sensor; and
    a recommendation training agent configured to
        generate performance data from the machine learning agent based upon operation of the machine learning algorithm within the RF environment,
        obtain environmental data from the at least one RF sensor, the environmental data comprising terrain blockage data and undesired RF source data, and
        change the RF environment based upon the performance data and based upon the environmental data so that the machine learning agent updates the machine learning algorithm.

9. The controller of claim 8 wherein the RF environment comprises one of a laboratory RF environment, a field RF environment, and a virtual RF environment.

10. The controller of claim 8 wherein the RF environment comprises at least one RF source; and wherein changing the RF environment comprises adding another RF source to the RF environment.

11. The controller of claim 8 wherein the recommendation training agent is configured to test the machine learning algorithm with at least one perturbation after updating the machine learning algorithm.

12. The controller of claim 8 wherein the recommendation training agent is configured to generate at least one knowledge graph based upon the RF model, the environmental data, and the performance data, and change the RF environment based upon the at least one knowledge graph.

13. A method of training a machine learning algorithm comprising:
    operating a machine learning agent of a processor to generate, using the machine learning algorithm, a radio frequency (RF) model to operate at least one RF actuator comprising an RF operating frequency selector based upon at least one RF sensor in an RF environment; and
    operating a recommendation training agent of the processor to generate performance data from the machine learning agent based upon operation of the machine learning algorithm within the RF environment, obtain environmental data from the at least one RF sensor, the environmental data comprising terrain data, RF interference data, and RF clutter data, and change the RF environment based upon the performance data and based upon the environmental data so that the machine learning agent updates the machine learning algorithm.

14. The method of claim 13 wherein the RF environment comprises at least one RF source; and wherein changing the RF environment comprises adding another RF source to the RF environment.

15. The method of claim 13 wherein operating the recommendation training agent comprises operating the recommendation training agent to generate at least one knowledge graph based upon the RF model, the environmental data, and the performance data, and changing the RF environment based upon the at least one knowledge graph.

16. The method of claim 13 wherein operating the recommendation training agent comprises operating the recommendation training agent to test the machine learning algorithm with at least one perturbation after updating the machine learning algorithm.

17. A non-transitory computer readable medium for training a machine learning algorithm, the non-transitory computer readable medium comprising computer executable instructions that when executed by a processor cause the processor to perform operations comprising:

operating a machine learning agent to generate, using the machine learning algorithm, a radio frequency (RF) model to operate at least one RF actuator based upon at least one RF sensor in an RF environment; and operating a recommendation training agent to generate performance data from the machine learning agent based upon operation of the machine learning algorithm within the RF environment, obtain environmental data from the at least one RF sensor, the environmental data comprising terrain blockage data and undesired RF source data, and change the RF environment based upon the performance data and based upon the environmental data so that the machine learning agent updates the machine learning algorithm.

18. The non-transitory computer readable medium of claim 17 wherein the RF environment comprises at least one RF source; and wherein changing the RF environment comprises adding another RF source to the RF environment.

19. The non-transitory computer readable medium of claim 17 wherein operating the recommendation training agent comprises operating the recommendation training agent to test the machine learning algorithm with at least one perturbation after updating the machine learning algorithm.

20. The non-transitory computer readable medium of claim 17 wherein operating the recommendation training agent comprises operating the recommendation training agent to generate at least one knowledge graph based upon the RF model, the environmental data, and the performance data, and changing the RF environment based upon the at least one knowledge graph.

\* \* \* \* \*